April 7, 1931.  L. F. CARTER ET AL  1,799,212
GYROSCOPIC BASE LINE FOR ORDNANCE
Filed May 16, 1923  5 Sheets-Sheet 1
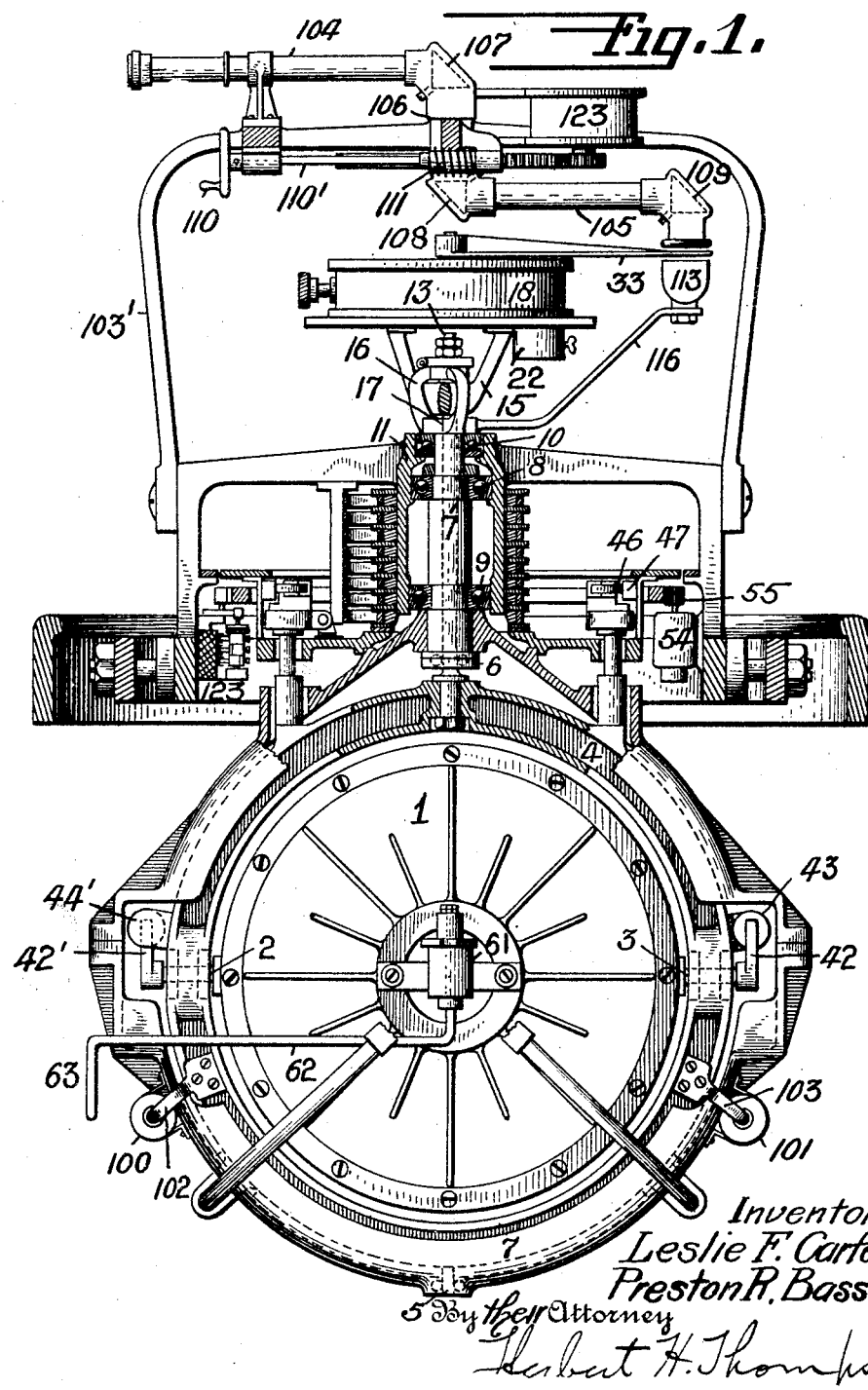

April 7, 1931.  L. F. CARTER ET AL  1,799,212
GYROSCOPIC BASE LINE FOR ORDNANCE
Filed May 16, 1923   5 Sheets-Sheet 2
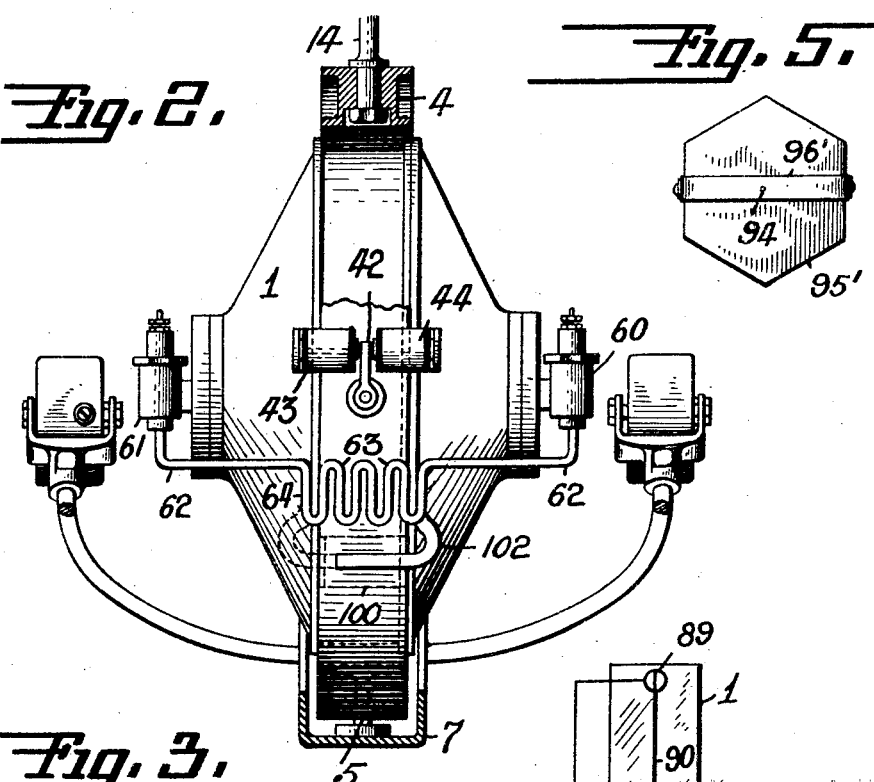
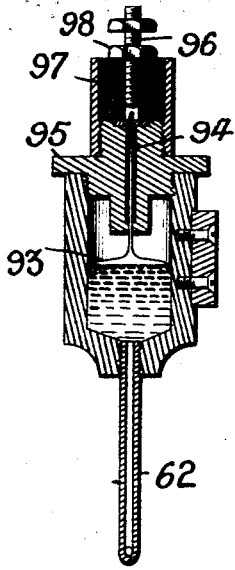
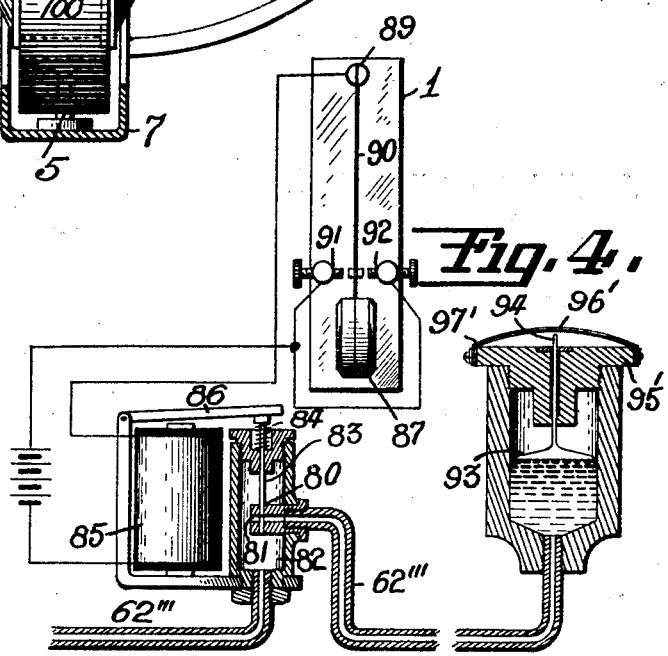
Inventors.
Leslie F. Carter &
Preston R. Bassett.
By their Attorney
Herbert H. Thompson April 7, 1931.    L. F. CARTER ET AL    1,799,212
GYROSCOPIC BASE LINE FOR ORDNANCE
Filed May 16, 1923    5 Sheets-Sheet 3

Inventors
Leslie F. Carter &
Preston R. Bassett
By their Attorney
Herbert H. Thompson April 7, 1931. L. F. CARTER ET AL 1,799,212
GYROSCOPIC BASE LINE FOR ORDNANCE
Filed May 16, 1923 5 Sheets-Sheet 4
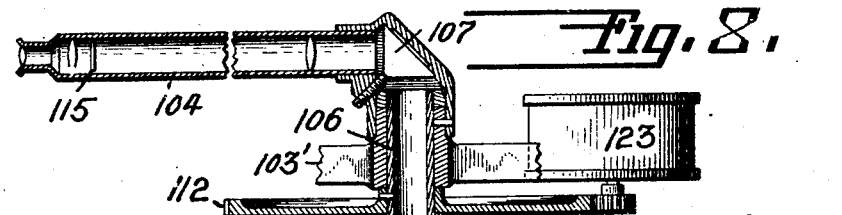
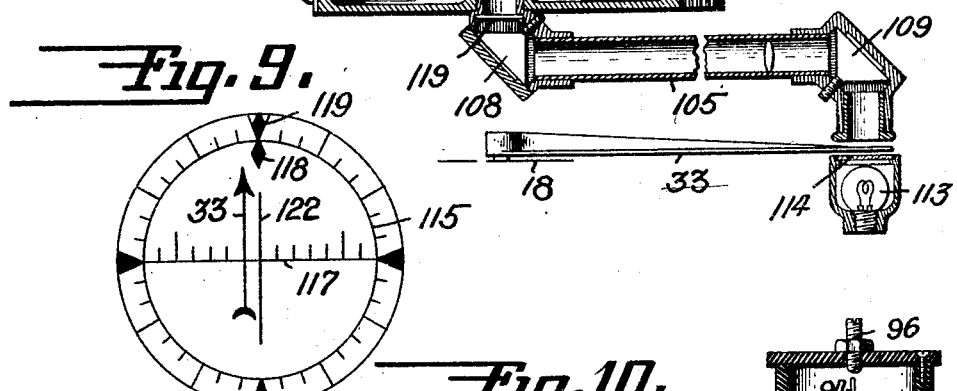
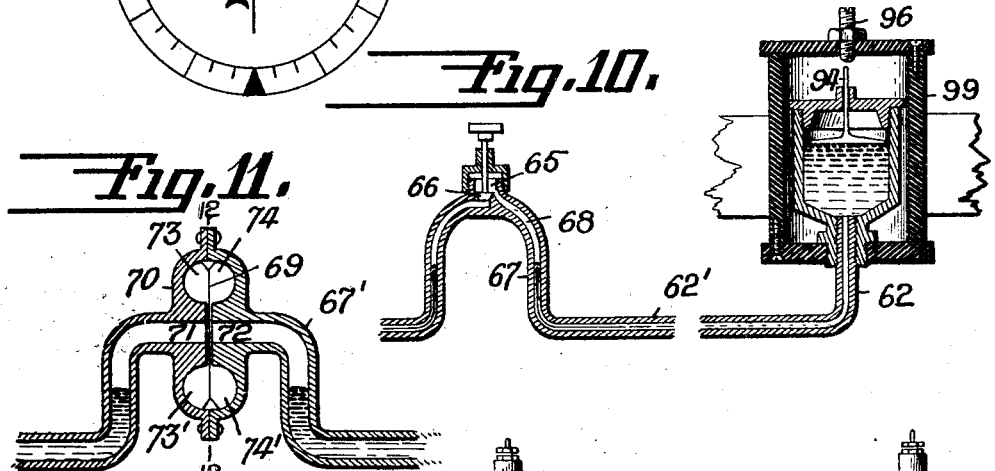
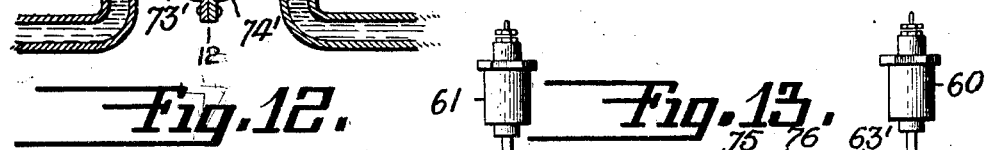
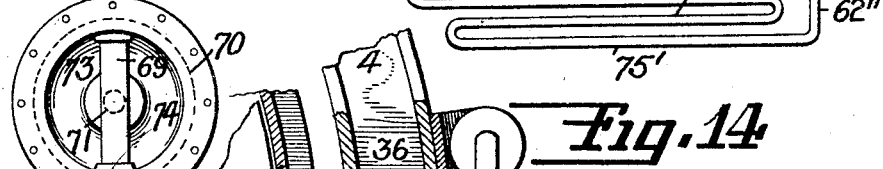
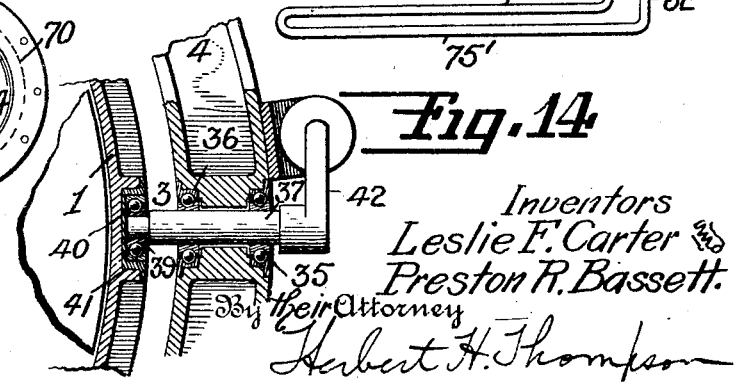
Inventors
Leslie F. Carter
Preston R. Bassett.
By their Attorney
Herbert H. Thompson

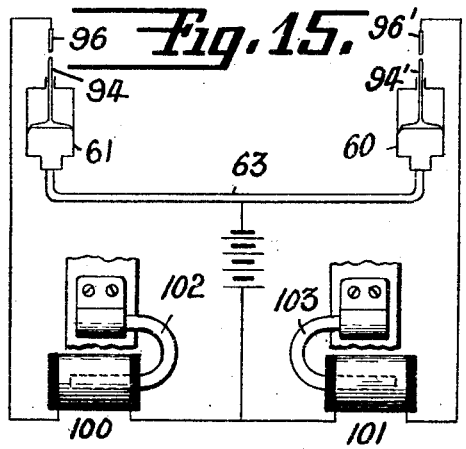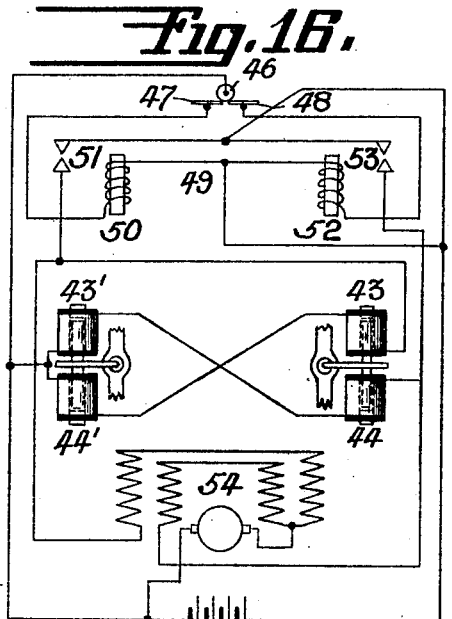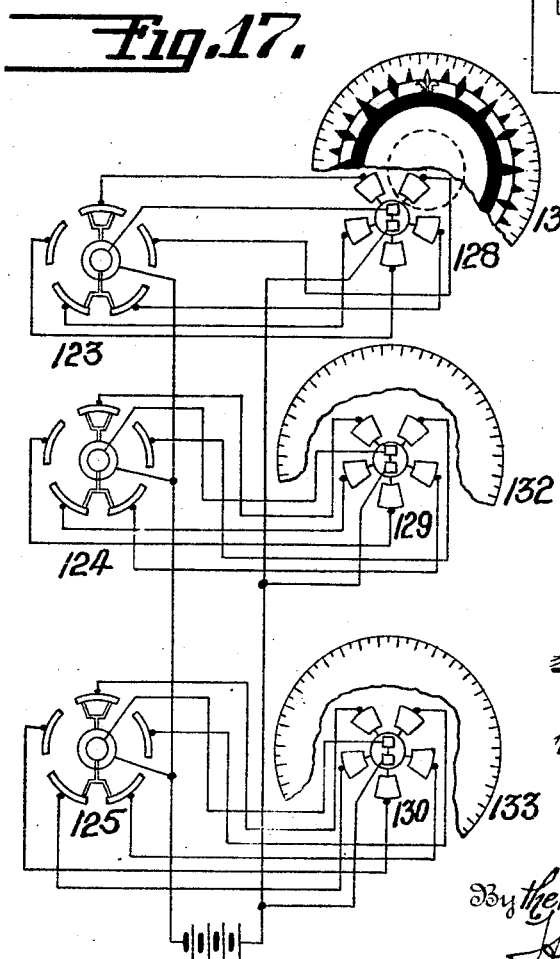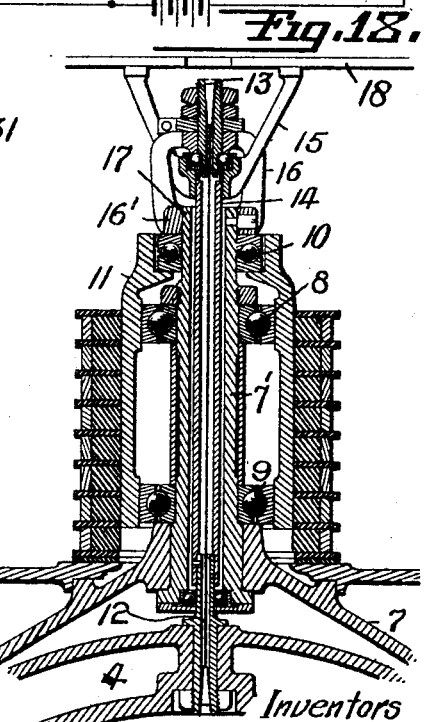

Patented Apr. 7, 1931

1,799,212

UNITED STATES PATENT OFFICE

LESLIE F. CARTER, OF LEONIA, NEW JERSEY, AND PRESTON R. BASSETT, OF BROOKLYN, NEW YORK, ASSIGNORS, BY MESNE ASSIGNMENTS, TO SPERRY GYROSCOPE COMPANY, INC., OF BROOKLYN, NEW YORK, A CORPORATION OF NEW YORK

GYROSCOPIC BASE LINE FOR ORDNANCE

Application filed May 16, 1923. Serial No. 639,290.

This invention relates to gyroscopic instruments for use on shipboard. It has a special reference to gyroscopic base line apparatus adapted for furnishing a fixed base line in the modern director fire control system. Up to the present time, it has been the practice to employ a gyroscopic compass both for navigation of a warship and as a base line in the ordnance work. Owing to certain fundamental principles of design, a gyroscopic compass is made more or less responsive to gravity and acceleration forces. It therefore has a tendency to wander slightly at times from the meridian, although of course, it returns to the meridian when the disturbing force ceases.

According to our invention, we propose to use a separate instrument from the gyroscopic compass for ordnance work and to construct said instrument so that it shall be substantially free from gravitation, acceleration, or other disturbing forces.

A further object of our invention is to secure a base line which is fixed with respect to the earth from such an instrument, by eliminating the apparent effect of the earth's rotation.

A further object of our invention is to maintain the apparent rate of movement in azimuth of the gyroscope substantially constant for a period of time by reducing or eliminating the rise of the gyroscope in elevation due to the earth's rotation.

A further object of the invention is the improvement in liquid level or control means for gyroscopic instruments whereby the effect of acceleration forces is substantially eliminated.

A further object of the invention is to improve on the system of transmission of the readings of gyroscopic apparatus in general to the repeater compasses or other devices whereby much greater accuracy is secured than by any method now employed.

A further object of the invention is the substantial elimination of the effects of temperature changes on the system.

Referring to the drawings in which what we now consider the preferred forms of our invention are shown, Fig. 1 is a south elevation, partly in section of a gyroscopic instrument constructed in accordance with our invention.

Fig. 2 is a side elevation of the lower portion of the instrument shown in Fig. 1.

Fig. 3 is a sectional detail of one of the cups or containers for the mercury, on opposite sides of the gyroscopes.

Fig. 4 is a diagrammatic sectional view showing a modified form of container and also a modified construction for the connecting tube between the containers.

Fig. 5 is a plan view of the top of the container shown in Fig. 4.

Fig. 8 is a sectional detail showing the means employed for transmitting the readings of the instrument to a distance.

Fig. 9 is a detail showing the appearance of the indicator when viewed through the periscopic device.

Fig. 10 is a section detail of a modified form of liquid container in which provision is made for temperature compensation.

Fig. 11 is a sectional detail of a modified form of tube connecting the containers, having means for preventing surging of the liquid from one container to another.

Fig. 12 is a section taken on line 12—12 of Fig. 11.

Fig. 13 shows another modification in the form of a connecting tube between the liquid containers.

Fig. 14 is a vertical section through a horizontal trunnion or bearing of the gyroscope.

Fig. 15 is a wiring diagram of the connections between the floats of the liquid containers and the magnetic torque applying device.

Fig. 16 is a wiring diagram showing the preferred means of causing continual oscillation of both the horizontal and vertical bearings of the gyroscope.

Fig. 17 is a diagrammatic view and wiring diagram showing the multiple repeating devices actuated from a plurality of transmitters on the master indicator.

Figure 6:
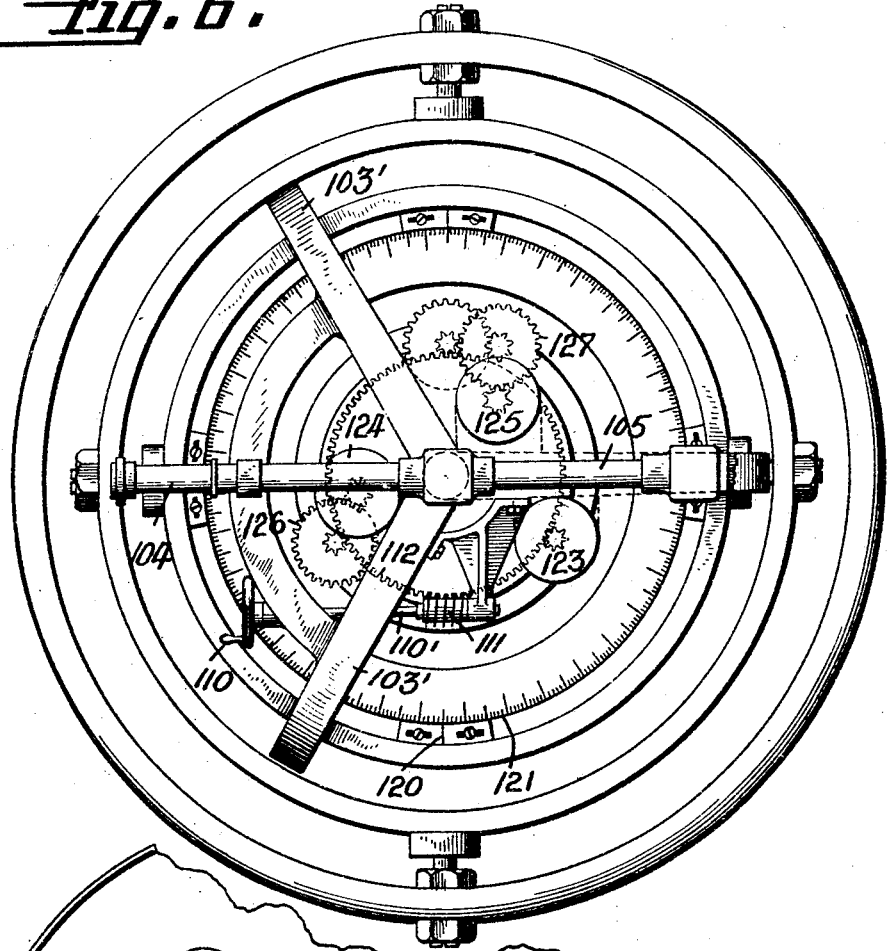
Fig. 6 is a plan view of the device shown in Figs. 1 and 2.

Fig. 18 vertical sectional view showing vertical suspension.

To illustrate our invention, we have adopted an instrument in which the gyroscope is mounted similarly to the mounting in the Sperry gyroscopic compass. It will be obvious however as the description proceeds that the invention has application to other methods of mounting the gyroscope. The gyroscope proper is shown as enclosed within a casing 1 of the usual form, the spinning axis of the rotor being perpendicular to the plane of the paper in Fig. 1. The casing 1 is mounted on horizontal trunnions 2 and 3 in the vertical ring 4, which ring in turn is journaled for rotation about a vertical axis in upper and lower guide bearings 5 and 6 in the follow-up ring 7. The gyro casing is perfectly balanced on horizontal trunnions 2, 3 and has therefore, three degrees of freedom. The follow-up frame in turn has an upwardly extending extension 7' which is journaled for rotation about a vertical axis in guide bearings 8 and 9 and is supported on thrust bearing 10 on the spider frame 11. The vertical ring may be suspended from the follow-up support as by means of wire suspension 12, which is secured to pin or screw 13 supported on the top of the follow-up system (Figs. 1 and 18). We have also shown the vertical ring provided with an upwardly extending sleeve 14 which carries at its upper end a bracket 15. The legs of said bracket extend out through the spaces between the legs 16 on a small bracket 16' rising from the top 17 of the follow-up support, said bracket 16' serving to support stem 13 secured to the suspension wire. It will thus be seen that the bracket 15 is supported on the sensitive element and does not have imparted thereto the continuous oscillations common to the follow-up support in the Sperry compass. To said bracket is secured a mechanism 18 for subtracting from the apparent movements of the gyroscope with respect to the earth, an equal and opposite movement, so that the indicator itself or at least, the transmitted indications have no movement real or apparent, with respect to the earth, and therefore, may be used as a base line.

Figure 7:
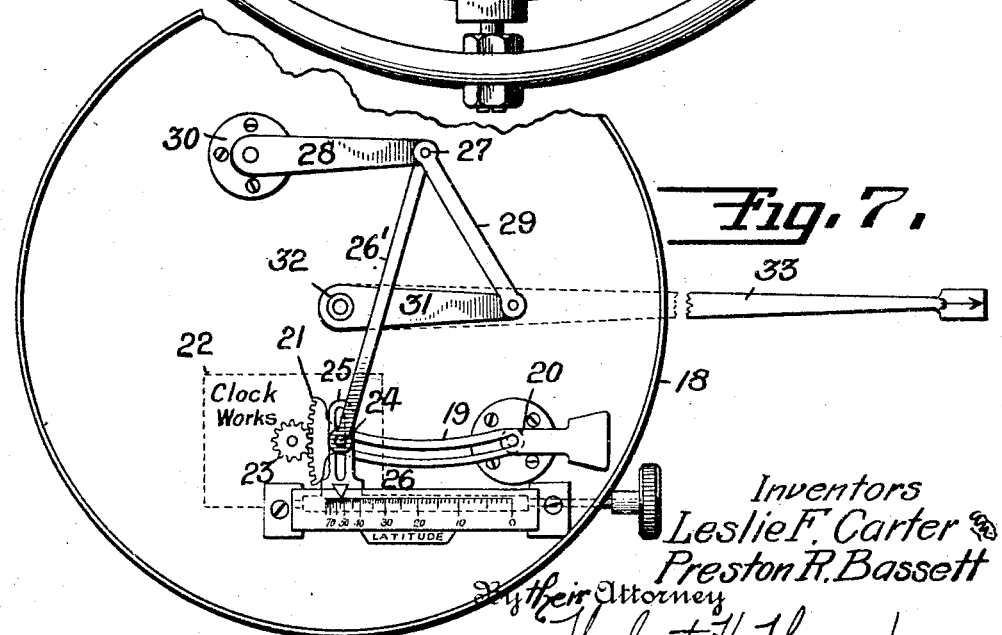
Fig. 7 is a view with the cover removed from the clock driven correction mechanism.

Since the apparent rate of movement of the gyro in azimuth may readily be computed for any given latitude, it being equal to the horizontal component of the earth's rotation at that point, we have provided a clock driven mechanism for effecting the above mentioned subtraction. A simple form of such mechanism is shown in Fig. 7, wherein a slotted arm 19 pivoted at 20 and having gear sector 21 at its outer end, is driven from clockwork 22 by a pinion 23. Slidably mounted in said slot is a pin 24 which extends through a slotted bar 25. Said bar is slidably mounted along scale 26, preferably graduated in degrees of latitude. It will be apparent that the rate of movement imparted to the lever 19 may be readily varied from zero at the inner end of the lever representing the equator, to a maximum of 90 degrees at the pole, where of course, the rate of movement is one-half the rate of an ordinary clock, namely one revolution in twenty-four hours. In intermediate latitudes, the rate varies as the sine of the latitude, the spacing of the graduations on scale 26 being therefore a function of the natural sine of the latitude. Said pin 24 is shown as connected by a link 26' to pivotal point 27, connecting lever 28 and link 29, the former being pivoted to the casing at 30 and the latter being linked to crank 31. Said crank is secured to a central shaft 32, to which is also secured indicating pointer proper 33.

For reducing to a minimum friction about the pivots of the gyroscopic instrument, we prefer to impart continuous oscillation to the relative parts of the bearing. This oscillation is imparted to the bearings about the vertical axis by maintaining the follow-up support in a state of continuous oscillation. The relative parts of the bearings about the horizontal axis are maintained in a state of oscillation as follows: Within the vertical ring 4 is journaled on ball bearings 35, 36 (see Fig. 14) a stub shaft 37. Said shaft at its inner end is provided with a reduced end on which is pressed the inner race 39 of the ball bearing 40. The outer race of said bearing is secured in a recess 41 in the gyro casing. The outer end of said shaft is shown as provided with a rocker arm 42 which forms the armature of a pair of opposed electro-magnets 43, 44 mounted on the vertical ring. Obviously, by alternately exciting said magnets, the armature 42 will be oscillated back and forth thereby oscillating the stub shaft 37 in the bearing races connected thereto.

Preferably, we accomplish the alternate excitation of said magnets by the same means that oscillates and turns the follow-up system. A simple method of effecting this is shown in Fig. 16. Referring to this figure and also to Fig. 1, 46 represents a trolley or brush mounted on the vertical ring, while 47 and 48 are one of two pairs of reversing contacts shown as mounted on the follow-up support. Said trolley and contacts are in circuits with the relay 49, so that when the trolley is on contact 47, magnet 50 of relay 49 is excited, closing contacts 51, while if the trolley is on the opposite contact, magnet 52 will be excited closing contact 53, and breaking contact 51. Said contacts are in circuit with the reversible motor, usually termed the azimuth motor 54, which oscillates and rotates the follow-up system through pinion 55 (Fig. 1). Said contacts are also in circuit respectively with magnets 43 and 44. It will be understood that the bearing opposite bearing 3 is similarly constructed and provided with magnets 43', 44'. As shown, the several magnets, 43, 43', 44, 44' are cross-connected so that the stub shafts on opposite sides of the gyroscope will be oppositely oscillated to avoid any possibility of a torque being exerted around the horizontal axis of the gyroscope.

While the apparent rate of movement in azimuth of a gyroscope when the axis is horizontal is known to be equal to the azimuth component of the earth's rotation at that point, it is also true that a gyroscope with three degrees of freedom has an apparent movement in elevation. As soon however as the axis of the gyro becomes elevated, its rate of movement in azimuth changes, becoming less as the elevation increases. We prefer therefore, to provide means for eliminating the vertical component of the gyro's movement without effecting its horizontal apparent movement.

Stating the matter from a different point of view, we prefer to give the gyroscope a movement in the vertical plane equal and opposite to the rise of its axis due to the earth's rotation, without effecting the fixity of the gyro's axis in azimuth. This we accomplish by providing a horizontal base line which brings into action a means for applying a torque about the vertical axis of the gyroscope upon the slightest microscopic variation of the axis of the gyroscope from the true horizontal. To provide such a means, we mount preferably on the gyro case a gravitationally responsive element such as a liquid level device comprising a pair of containers 60, 61 shown as secured to the gyro case 1 on opposite sides of the horizontal axis 2, 3. Said containers are connected by a restricted tube or tubes 62, so that the liquid in both containers is always at the same level. As the primary fluid we prefer to employ mercury, although it will be obvious from the description herein that other liquids may be employed. Preferably the containers 60 and 61 are made of such small cross section that the torque around the horizontal axis exerted by the displaced mercury is negligible for the microscopic tilts permitted by the torque applying means hereinafter described. In other words the gyroscope remains in substantially neutral equilibrium around its horizontal axis 2—3.

In order to prevent, as far as possible, acceleration pressures from any cause from disturbing the horizontality of the liquid, we prefer to provide means, preferably located in the connecting tube 62 for retarding or opposing the flow of liquid from such causes. One method of accomplishing this result, is by providing the tube 62 with a series of reversed bends 63 (Fig. 2). This not only provides a longer path for the liquid and hence offers greater friction to the movement of the liquid, but by such construction, the effect of lateral acceleration forces on the vertical portions 64 of the reversed bends is eliminated.

Another method of accomplishing this result is by providing a restricted passage 65 within the tube 62' as shown in Fig. 10. Such passage is shown in the form of an adjustable needle valve 66, preferably located in the upper portion of an inverted U bend 67. Since mercury is apt to break up into globules if forced through a small opening, we prefer to trap a small amount of oil 68 in the upper portion of said U bend, so that only oil is forced to pass through the restricted opening.

Still another method of accomplishing the result is shown in Fig. 11, wherein the reverse U bend 67' is again preferably filled with oil and is provided with a transversely extending strip 69 secured in the enlarged portion 70. Said strip may be formed of oiled silk or a very thin sheet metal and normally stands midway between openings 71 and 72. In case the liquid flows very slowly from one opening to the other, the oil will have time to flow around the strip 69 out through annular channels 73 and 73', and back through annular channels 74, and 74', but in case of sudden movement of the oil due to sudden acceleration pressure or the like, the strip 69 will be forced against one opening or the other and thus acts as a valve to stop the flow of the liquid.

Still another method of retarding the flow due to acceleration pressure is shown in Fig. 13, wherein a series of laterally extending reverse bends 63' are provided in the tube 62''. By such a construction a further advantage is secured, i. e., an acceleration force acting on portion 76 of the pipe will oppose that acting on portions 75 and 75', so that the effect of the force is reduced as compared to the length of pipe employed.

The above described methods of restricting the flow of liquid are efficacious for preventing surging of the liquid due to roll and pitch of the ship and thus prevent what is usually termed "intercardinal" or "quadrantal" error. In gyroscopic compasses, however, it is desirable to permit the flow of the liquid responsive to changes in speed or course of the ship in order to secure what is known as ballistic deflection. In my baseline apparatus, however, ballistic deflection is not needed since it has no gravitational control about the horizontal axis, and, therefore, no change in settling point due to changes in the speed, course or latitude of the ship. If the liquid were permitted to be influenced by change in speed or course, therefore, it would give rise to temporary deviation of the gyroscope, which is undesirable, and in Fig. 4 I have shown a means for preventing the flow of liquid under these conditions. According to this figure a valve 80 is provided in the pipe 62''', said valve being shown in the form of a small gate valve adapted to close the passage 81 when lowered. The passage 81 leads into a chamber 82 which is in communication with the other portion of pipe 62''' at its bottom. The stem 83 of said gate valve is normally held upwardly by a spring 84, but is pushed downwardly when acceleration forces are acting, by means such as electromagnet 85 which acts upon the pivoted armature 86 resting on the top of the stem 83. Said magnet is controlled by a means responsive to acceleration forces acting in N–S direction, such as a small pendulum 87 which, it will be understood is preferably mounted on the gyro casing 1 by means of a pin 89. A thin leaf spring 90 may support the pendulum bob 87. Said pendulum is adapted to make contact when displaced to the right or left, with contacts 91, 92 respectively, which are in circuit with the magnet 85.

To provide a means for accurately detecting variations of the liquid level within the containers and to bring into action thereby means for applying a torque on the gyroscope, we provide small floats 93 (Fig. 3) within the containers which rest on top of the liquid therein. Said floats are provided with stems 94 rising through small apertures in the cap 95 on said containers. Adjustably mounted on each of said caps 95 and preferably insulated therefrom, is a contact, shown in the form of a screw 96 threaded in the insulation 97 and locked in place by lock nut 98. Obviously, said screw may be adjusted so that when the compass is horizontal, the stem 94 is spaced from the contact only by .001 of an inch, or less.

In order to compensate for temperature changes in the system, we may adopt the alternative construction of contact shown in Figs. 4 and 5. In this form contact 96' with which the stem 94 is adapted to engage, may be made in the form of thermostat strips 97' clamped on the cap 95', so that as the temperature rises, they will buckle upwardly and thus compensate for the expansion of the liquid column supporting the floats 93.

Another method of providing temperature compensation is by supporting the threaded contact 96 (Fig. 10) on posts 97, (Fig. 3) of hard rubber, or other substance having a temperature expansion coefficient similar to mercury. Obviously, as the temperature rises, contact 96 will be moved away from the stem 94.

For exerting a torque on the gyroscope, we have shown a pair of oppositely connected solenoids 100 and 101 mounted upon the follow-up ring 7 (Fig. 1). Each solenoid acts upon a movable core 102, 103 secured to the vertical ring. Solenoid 100 is placed in circuit with contacts 94, 96 (Fig. 15), while solenoid 101 is placed in circuit with the opposite contacts 94', 96'. Obviously, the excitation of one or the other of the solenoids will exert a torque about the vertical axis of the gyroscope in the proper direction to eliminate any tilt of the gyroscope which occurs.

Since it may be inconvenient to utilize the movements of the pointer 33 as a base line and since it may be desirable to reproduce its movements at a plurality of points on the ship, we have shown a transmission system in connection therewith. Such system we have constructed to operate at a much greater degree of accuracy than has heretofore been attempted in this art. Above the pointer 33 on bracket 103', we mount a sighting device consisting of a stationary part 104 and a rotary part the latter comprising a central vertical portion or tube 106 (Figs. 1 and 8) journaled in frame 103' and a horizontal tube 105 secured thereto. The stationary portion 104 is equipped with a scale 115 (Fig. 9) and also with a prism 107 adapted to direct the line of sight downwardly along the axis of rotation of the rotatable part. The rotatable part is also provided with a prism 108 adapted to direct the line of sight transversely and with a second prism 109 to direct the line of sight downwardly upon the indicator 33. To rotate the portion 105, we have shown a hand wheel 110 journaled on bracket 103', the shaft 110' of which is provided with a worm 111 meshing with a gear 112. Below said pointer 33 we may provide a lamp 113 and an auxiliary scale 114 between the lamp and the pointer 33. The lamp and scale 113, 114, are preferably mounted on follow-up support 17 as by means of a bracket 116. What is seen through the sighting device is represented in Fig. 9, the outer scale being the fixed scale 115 in the stationary part 104. The horizontal markings 117 are the scale on the glass 114, while the arrow 33 is seen approaching the cross hair 122 on (say) the lower face of prism 109. An index 118 may also be provided at some point such as 119 on the rotatable portion. The manner in which the operator uses this portion of the instrument is as follows: when it is desired to take a reading, the operator first observes the heading of the ship from the reading of the lubbers line 120 on the main scale 121 on the instrument (Fig. 6). Then looking through the telescope, he turns the hand wheel 110 until the marker 118 visible through the telescope, nears the same reading on the card 115 as the reading of line 120 on card 121. This will bring the scale 117 into view. Then by careful adjustment, the pointer 33 is finally brought into alignment with the crosshair mark 122 in the telescopic device with a plus or minus error far below that possible with a mechanical follow-up system.

Connected to the rotatable gear 112 are one or more transmitters 123, 124 and 125. In order to transmit the readings as accurately as possible, we prefer that such transmitters be driven at different rates. As shown, the transmitter 123 is driven at the lowest rate, 124 at the next higher by means of single reduction gearing 126, and transmitter 125 at the highest rate by means of double reduction gearing 127. Said transmitters are shown (Fig. 17) in circuit respectively with repeater motors 128, 129 and 130, which turn respectively rotary indicators 131, 132 and 133. Said indicators obviously may be designed to read in decimals or other fractions of one another. For instance, one indicator may read in degrees, the second in minutes and the third in seconds. By this construction, the readings of the master instruments may be transmitted with an accuracy far in excess of anything heretofore achieved in this class of apparatus. As shown, repeater motors 129 and 130 are directly connected to dials 132 and 133 and, therefore, have a one to one drive with the same without the interposition of reduction gearing as indicated in the case of motor 128 and dial 131. Therefore, dials 132 and 133 are self-synchronous with the transmitters 124 and 125 respectively.

From the foregoing, the operation and use of our invention will be apparent. When a ship is going into battle or battle practice and it is desired to establish a base line for the fire control and manœuvres, the gyroscope operator brings his sighting device in the line with the indicator 33 as above described and thereby transmits to all of the repeating instruments connected thereto, the true azimuth of the indicator 33. The azimuth position of said indicator is maintained by the fact that the rate of movement in azimuth of the gyroscope with respect to the earth is known for that latitude and is subtracted by setting the indicator 26 within the clock-driven correction device 18 for the latitude in which the ship is at the time. The clockwork will then turn the indicator 33 backwards at the same rate that the gyroscope turns it forwards, the result being that indicator 33 is maintained fixed with respect to the earth and therefore forms a suitable base line for fire control. The gyroscope being perfectly balanced about its horizontal axis is unaffected by acceleration forces which disturb the gyro-compass, and will maintain its apparent rate of movement uniform. The effect of the rise of the gyro's axis due to the earth's rotation is eliminated by applying a torque around the vertical axis to cause precession around the horizontal axis of the gyroscope whenever it becomes inclined the slightest amount. In this system the transfer of liquid to bring into action the torque applying means about the vertical axis is so slight as not to disturb the balance of the gyroscope and/or to furnish an unbalanced condition upon which acceleration forces might act.

We do not claim by our invention to provide an instrument which will supercede the gyro-compass in navigation, since it is merely a device which will hold a given base line for a limited period of time, with greater accuracy than is possible with a gyroscopic compass.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described our invention, what we claim and desire to secure by Letters Patent is, 1. In a base line gyroscopic apparatus comprising a gyroscope, means for mounting the same with three degrees of freedom, an indicator controlled thereby and a clockwork associated therewith and adapted to reversely control the indicator to prevent the apparent movement thereof that would be otherwise caused by the rotation of the earth.

2. In a base line gyroscopic apparatus comprising a gyroscope, means for mounting the same with three degrees of freedom, an indicator controlled thereby, a clockwork associated therewith and adapted to reversely control the indicator to prevent the apparent movement thereof that would be otherwise caused by the rotation of the earth, and means for varying the rate of movement imparted by the clockwork in accordance with the latitude.

3. In a base line gyroscopic apparatus comprising a gyroscope, means for mounting the same with three degrees of freedom, means for preventing the vertical component of the earth's rotation from affecting the gyroscope, while leaving it free for apparent movement in azimuth due to the horizontal component of the earth's rotation, an azimuth indicating means actuated by said gyroscope, and means for preventing the above mentioned movement in azimuth of the gyroscope from affecting the readings of said indicating means.

4. In a gyroscopic base line apparatus, the combination with the gyroscopic element, of a clockwork mounted on said element to turn in azimuth therewith, an indicator actuated by said clockwork to turn oppositely to the apparent turning of the gyroscope due to the earth's rotation, and means whereby said clockwork may be set to turn said indicator at an equal and opposite rate to said rate of turn of the gyroscope.

5. In a base line gyroscopic apparatus comprising a gyroscope, means for mounting the same with three degrees of freedom, an azimuth indicator controlled thereby, a clockwork associated therewith and adapted to subtract from the indications of the indicator the apparent movement thereof caused by the azimuth component of the earth's rotation, and means for preventing rise of the gyroscope in elevation whereby the azimuth movement thereof is maintained constant.

6. The combination with a gyroscopic base line instrument, of means for transmitting to a distance the position thereof comprising a sighting device rotatably mounted adjacent said instrument, means for rotating said device to sight it on a predetermined part of said instrument, and a transmitter actuated by said device and adapted to actuate a repeating indicator.

7. The combination with a gyroscopic base line instrument having a scale, of means for transmitting to a distance the position thereof comprising a sighting device rotatably mounted adjacent said instrument; means for rotating said device to sight it on a predetermined part of said instrument, a scale and index visible through said device and adapted to be set in accordance with the scale on said instrument, and a transmitter actuated by said device and adapted to actuate a repeating indicator.

8. In a base line gyroscopic apparatus comprising a gyroscope, means for mounting the same with three degrees of freedom, an azimuth indicator controlled thereby, a clockwork associated therewith and adapted to subtract from the indications of the indicator the apparent movement thereof caused by the azimuth component of the earth's rotation, means for detecting changes in the level of said gyroscope and means brought into action thereby for maintaining the level of said gyroscope.

9. In a base line gyroscopic apparatus comprising a gyroscope, means for mounting the same with three degrees of freedom, an azimuth indicator controlled thereby, a clockwork associated therewith and adapted to reversely control the indicator to prevent the apparent movement thereof that would be otherwise caused by the azimuth component of the earth's rotation, a liquid level including temperature compensated means for detecting changes in the level of said gyroscope and means brought into action thereby for maintaining the level of said gyroscope.

10. In a base line gyroscopic apparatus comprising a gyroscope, means for mounting the same with three degrees of freedom, means responsive to tilt of the gyroscope for eliminating said tilt, an indicator controlled thereby and a clockwork associated therewith and adapted to subtract from the indications of the indicator the apparent movement thereof caused by the rotation of the earth.

11. In a gyroscopic base line apparatus, the combination with the gyroscopic element, of a gravitational control element associated therewith, means brought into action by relative tilt of said elements for exerting a torque about the vertical axis of the gyroscopic element, and clockwork associated with said gyroscopic element and adapted to prevent the apparent movement in azimuth of the gyroscopic element from altering the readings of the apparatus.

12. In a gyroscopic baseline apparatus, the combination with the gyroscopic element, means for mounting the same in substantially neutral equilibrium, of power means brought into action by tilt of the gyroscope for applying a torque about the vertical axis of the gyroscope for maintaining the gyroscope level, an azimuth indicating means actuated by said gyroscope, and means for preventing the apparent rotation of the gyroscope in azimuth due to the earth's rotation from affecting the readings of the indicating means.

13. In a gyroscopic baseline apparatus, the combination with the gyroscopic element, means for mounting the same in substantially neutral equilibrium, of a liquid level device mounted thereon, power means brought into action by tilt of the level for applying a torque about the vertical axis of the gyroscope for maintaining the gyroscope level, an azimuth indicating means actuated by said gyroscope, and means for preventing the apparent rotation of the gyroscope in azimuth due to the earth's rotation from affecting the readings of the indicating means.

14. In a gyroscopic baseline apparatus, the combination with the gyroscopic element, of a liquid level device connected thereto for controlling the application of torques thereon, comprising a pair of liquid containers, a tube connecting the same, a float in each container, a contact controlled by each float, and temperature responsive means for preventing changes in temperature which would otherwise alter the relative position of said contacts and hence alter the operation, from altering the operation of said contacts.

15. In a gyroscopic baseline apparatus, the combination with the gyroscopic element, of a liquid level mounted thereon, means brought into action by variation of the level of the liquid therein for applying a torque about the vertical axis of the gyroscope, such variations being due both to tilt or changes in volume due to heat and thermo-responsive means for preventing such changes in volume of the liquid due to heat from affecting said first-named means.

16. In gyroscopic apparatus of the character described, the combination with the gyroscopic element, of means for transmitting to a distance the position thereof in azimuth comprising an indicator on said apparatus, a sighting device rotatably mounted adjacent said indicator, a coarse scale on said indicator according to which said sighting device is brought to the approximate position with respect to said indicator, a fine scale also on said indicator and at a greater radius from the center of turning of said indicator than said coarse scale, said fine scale being visible through said sight by which the sight is accurately adjusted to the same position as said element.

In testimony whereof we have affixed our signatures.

LESLIE F. CARTER.
PRESTON R. BASSETT.